United States Patent [19]

Chen et al.

[11] Patent Number: 4,805,998
[45] Date of Patent: Feb. 21, 1989

[54] VARIABLE ANAMORPHIC LENS SYSTEM

[76] Inventors: Ying T. Chen, Apartment #2. 84 S. Greenwood Ave., Pasadena, Calif. 91107; Mary Z. Luo, Apartment #5, 293 N. Hill Ave., Pasadena, Calif. 91106

[21] Appl. No.: 120,530
[22] Filed: Nov. 13, 1987
[51] Int. Cl.⁴ .................. G02B 13/12; G02B 13/18; G02B 5/10
[52] U.S. Cl. .................................. 350/420; 350/432; 350/619
[58] Field of Search .............. 350/432–435, 350/420, 421, 619

[56] References Cited

U.S. PATENT DOCUMENTS

| | | | |
|---|---|---|---|
| 3,285,129 | 11/1966 | Kompfner et al. | 350/420 |
| 3,576,357 | 4/1971 | Levy | 350/420 |
| 3,583,790 | 6/1971 | Baker | 350/432 X |
| 4,457,592 | 7/1984 | Baker | 350/432 |
| 4,650,292 | 3/1987 | Baker et al. | 350/432 |

Primary Examiner—John K. Corbin
Assistant Examiner—Scott J. Sugarman
Attorney, Agent, or Firm—Albert O. Cota

[57] ABSTRACT

A variable anamorphic lens system adaptable for use on an image recording instrument such as a camera (10). The system consists of an image transformation lens (14), a focusing lens (18) and an aperture stop (22). The transformation lens (14) and focusing lens (18) function together to form an image, on the camera's image plane (26), of a remote object at or near an object plane (30) as determined by the field of view. By manipulating the image transformation lens (14), the image of the remote object, or an insolated portion of the object, can be modified or transformed so that an altered image is formed on the image plane (26) of the camera (10).

9 Claims, 6 Drawing Sheets

VARIABLE ANAMORPHIC LENS SYSTEM

FIELD OF THE INVENTION

This invention relates to an optical system, and more particularly to a variable power anamorphic lens system, for introducing selected image transformation.

Such an anamorphic lens system, designed for use either as a complete lens system or as an add-on system has continually varying power across the surface of the lens including a substantially neutral zone which may cause selected image portions to be distorted upon rotation of the system about the optical axis through the lens systems.

DESCRIPTION OF THE PRIOR ART

Optical systems using anamorphic and other forms of image transformation lenses are usable with film or electronic image recording cameras and image projection systems. Typically, such lenses are commonly used with "standard" or complete optical systems having spherical lens elements to form images of objects on an image plane, which images are other than "conventional" vertical to horizontal aspect ratios for the image recording medium in use.

In a typical anamorphic lens system, the aspect ratio of the recorded image is varied from standard, usually by compressing the horizontal ratio. Thereafter, the compressed image is projected through an image expanding optical system result in a "wide screen" image. Since these camera/projection systems are intended for use with fixed viewing systems, the compression expansion of the aspect ratio usually modifies only the horizontal aspect of the image.

One anamorphic lens system available in the market is a pure cylindrical lens system made by Bell & Howell Company. This lens is capable only of compressing the image along one axis, and expanding the image along the other axis in a fixed ratio. The distortion of the image of this lens system is limited and is not controllable as is the image of the present invention. Further, the lens requires pair of elements which must be moved in a complex manner relative to one another.

An anamorphic lens, as shown in U.S. Pat. No. 3,751,138 to Humphrey, is a lens which generates variable cylindrical lens power and variable cylindrical lens rotational alignment over incremental viewpoints chosen through its surface. As a result of the fact that this lens chose a geometric surface different from that of the present invention, it is difficult to be used in combination with other standard lens as to obtain a proper focusing result. It is difficult to use the prior art lens in a locally proportional amplifying manner to achieve a special photography effect.

SUMMARY OF THE INVENTION

The variable anamorphic lens system is capable of providing a special photographic effect with properly focused image and continuous, but unlimited and selectable image distortion. The simplest form of the anamorphic lens system of the present invention is configured with three components including an image transformation lens, a focusing lens and an aperture stop. The transformation lens is configured by a hypergeometric surface described by a mathematical equation. The resulting transformation lens provides variable optical power across the image forming optics of the lens to modify selected portions of the image of the scene or object being photographed. The transformation lens system, used with the focusing lens system and associated aperture stop, has many applications due to its property of locally amplifying images in a proportional manner by magnification or reduction depending upon the displacement of the subject away from the optical axis of the lens and rotation of the lens system relative to particular objects in the field of view.

The image transformation lens is intended to be used in combination with a focusing lens optical system designed to form an image and having an aperture stop for controlling the angle of acceptance of light rays entering through the focusing lens, thereby making the depth of field much longer to help provide a sharp image on the image recording medium or film. Segments of the surface of the transformation lens system of the present invention differ one from the other so that the effective amplification of an image through the applied optical system is selectively modified. Since segments of the image transformation lens each have different image amplifying powers, a given lens segment is capable of being moved, by lens rotation, to vary the portion of the image formed by that segment of the transformation lens system. The image blends smoothly into images formed by adjacent segments of the surface of the lens system. This transformation lens system has a neutral or near neutral area through which some of the image of the subject matter of the scene is substantially unmodified, and which image can act as a useful reference.

The present anamorphic optical system can transform images reversibly, namely, the distorted picture taken through this anamorphic lens system can be transformed back to its original image using the same lens system by placing the distorted picture at a proper distance and rotating the transformation lens for 180°.

The present anamorphic optical system is intended for enabling image modification to be oriented at any desired angle relative to the vertical or horizontal axes of the optical system. That is, the optical system may be rotated to cause modification of the image along any axis perpendicular to the optical axis of the lens system. Also, as the distance between the transformation lens and the focusing lens change, the distortion of the transformation lens system changes proportionately.

The surface of the image transformation lens element can be best defined as a hypergeometric equation in a Cartesian coordinate, as set forth below, The variable anamorphic lens system of the present invention is applicable to artistic endeavors wherein the photographer desires to modify the image being photographed, where the photographer desires other than a straightforward image, as for aesthetics purposes, and where the result is intended to permit modification of perspective or ratio of an image or portions of an image in a desired manner.

An object of the present invention is to provide a transformation lens system for image transformation of different powers along selected surface segments, for formation of the image on an image plane.

Another object is to provide a transformation lens usable with a focusing lens system and in conjunction with an aperture stop of the focusing lens system to obtain selected imaging characteristics maintained in substantially sharp focus across the field of view. The mathematical formula of the focusing and amplification for the whole optical system is disclosed in detail.

Yet another object is to include in the variable anamorphic lens system a capability of displacing the position of a selected object image portion along a neutral zone which does not modify the image passing through the lens thereby permitting non-modification of the image through the neutral zone irrespective of the rotation of the lens system.

BRIEF DESCRIPTION OF THE DRAWINGS

FIG. 8A-8K are sectional views of the transformation lens taken along lines AA to KK, respectively of FIG. 7.

DESCRIPTION OF THE PREFERRED EMBODIMENT

The best mode for carrying out the variable anamorphic lens system is presented in terms of a preferred embodiment that is primarily designed to modify the image being photographed by introducing selected image transformations.

The preferred embodiment, as shown in FIGS. 1 through 8 is comprised of the following three major elements: an image transformation lens 14, a focusing lens 18 and an aperture stop 22.

Figure 1:
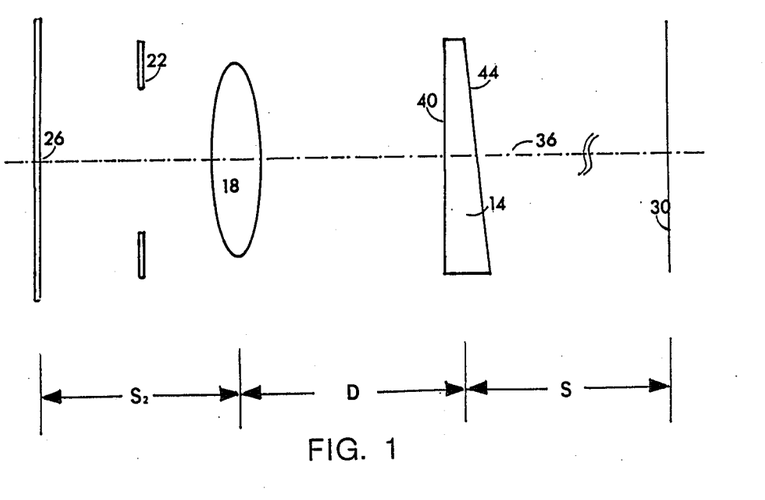
FIG. 1 is a representative view of the basic variable anamorphic lens system.
Figure 2:
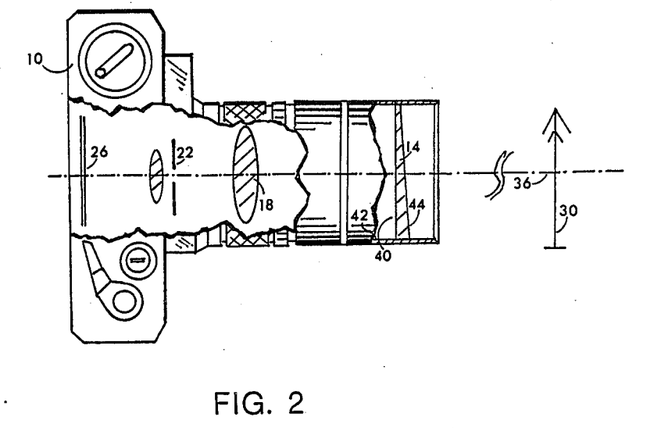
FIG. 2 is a cut-away schematic of a variable anamorphic lens system attached to a photographic camera including a focusing lens, an aperture stop, an image plane shown in typical orientation for forming an image of an object on the image plane of the camera.

As shown in FIGS. 1 and 2, an image recording instrument or camera 10 is provided with the transformation lens 14, the focusing lens 18, the aperture stop 22, and an image plane 26 on which the image of the subject matter in an object plane 30 is formed. In the inventive variable anamorphic lens system, the lens system may either be designed with the focusing lens 18 incorporating the image transformation lens 14 or as an add-on to be mounted to the front of the focusing lens of the camera 10. The image formed on the image plane 26 is transmitted along an optical axis 36 defined by the combined lens systems The transformation lens 14 modifies or transforms the image of the remote object, or a selected portion thereof, so that an altered image is formed on the image plane 26 of the camera by the focusing lens system 18.

The image transformation lens 14 includes a primary optical element 40 mounted in a barrel 42 which may be rotated and translated relative to the focusing lens 18 which is fixed relative to the recording system or the camera body 10. The rotation of the barrel about the optical axis 36 defined by the focusing lens 18 is to enable control of the distortion of the image on the image plane 26 of the camera 10. For example, by rotating the lens by selected arcuate amounts, the image of an object of a certain geometry will be transformed to a distorted shape as displayed in FIG. 5. That is, a small portion of an image of the object can be isolated and selectively translated by manipulating the orientation of the object within the field of view of the transformation lens system. Clearly, by selective modification of the ray bundle through the lens, the image of the object may be altered to make the recorded image appear as a modification of the object. The translation of the barrel relative to the focusing lens is to enable changing of the distance between the image transformation lens and the focusing lens. The longer this distance is, the greater the distortion will be, and vise versa. However, the extent of increase of the distortion is limited by the defocusing effect resulting from reduction in depth of field due to translation of the image transformation lens element. A proper distance range of the translation of the barrel can be calculated based on the formula of Equation (5).

Figure 7:
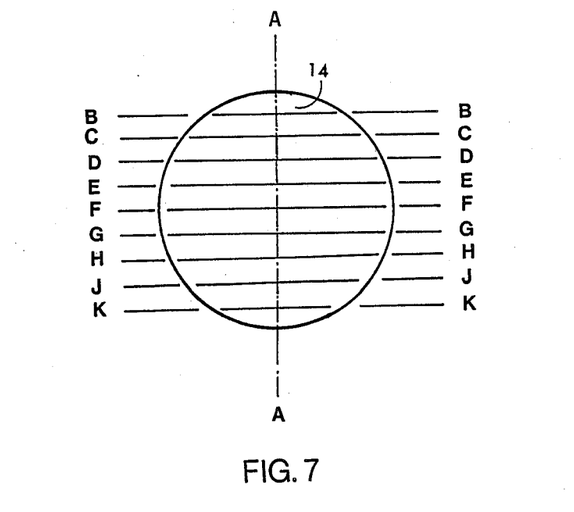
FIG. 7 is a planar view of the image transformation lens with cross-section lines added.
Figure 8:
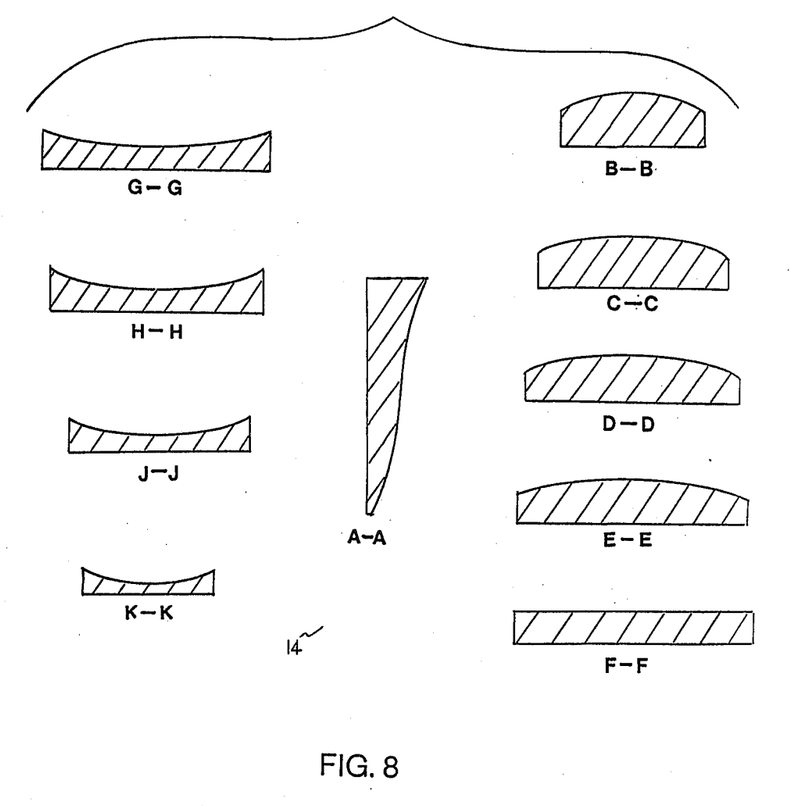

The image transformation lens element 14 is the element shown in FIG. 7 with a plurality of section lines A-K representing segments of the lens as would be seen in cross-section. The cross-sections, according to respective section lines are seen in FIG. 8. Sections BB to EE represent convex sections, while section lines GG to KK, represent concave sections. Respective sections cause the image portions passing therethrough to be modified to a different extent than image rays passing through adjacent sections. Cross-section AA represents the surface central curve as taken substantially parallel across the various section lines or segments of FIG. 8. The selected segments of positive or negative value of increasing power are spaced substantially an even distance from the central area which makes convertible property of the lens system as explained above.

Section FF represents a substantially planar section which will not alter substantially the image passing therethrough. This substantially neutral zone is defined along a substantially central diametrical area of the transformation lens element.

Figure 6:
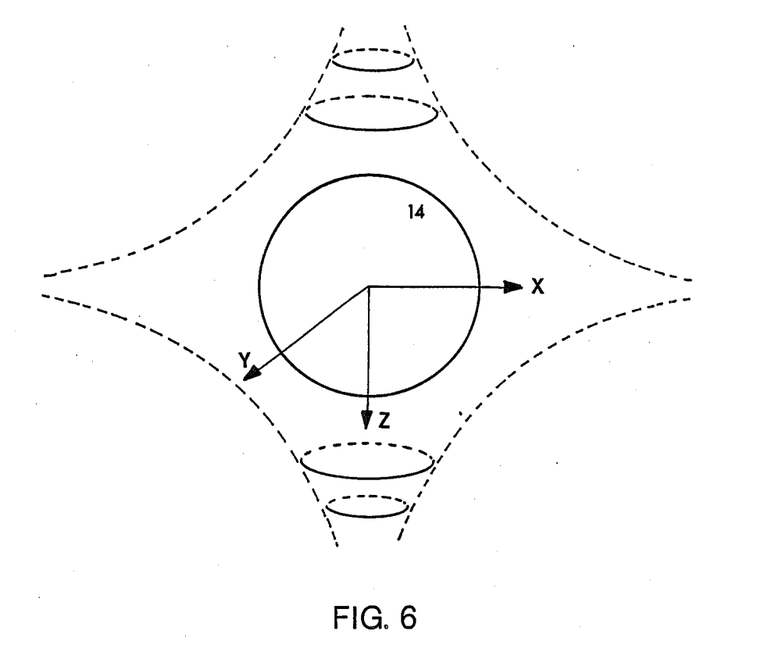
FIG. 6 is a representation of the surface of the transformation lens as described with a Cartesian coordinate system.

FIG. 6 describes the surface of the image transformation lens element, as defined by Equation (5) in X, Y, Z Cartesian coordinates.

The surface of the image transformation lens element 14 can be described by the following equation $$Z^2(X^2 30 Y^2) = K^2. \quad (1)$$

where K is a constant defining the extend of the curavature of the surface of the image transformation lens element 14. When $k = \infty$, the surface of the lens is flat, thereby introducing no modification of rays being transmitted through that section.

Combining the formula of this transformation lens with the formula of a focusing lens, an image of the object is formed thereby on the image plane 26 of the camera 10. The image received by the combined lens system is located at:

$$S_2 = \frac{f_2(D+S)}{D+S-f_2} - \sum_{n=1}^{n=\infty} \frac{f_2^2 S^2 (DS - Sf_2)^{n-1}}{(D+S-f_2)^{n+1} a^n} Z^n. \quad (2)$$

where $$a = \frac{K}{n-1}$$

and n is the refractive index of the image transformation lens; D is the distance between the focusing lens and image transformation lens; $f_2$ is the focal length of the focusing lens, and S is the distance between the object and image transformation lens and $S_2$ is shown in FIG. 1. The amplification of the lens system including the transformation lens and the focusing lens is:

$$M = - \sum_{n=0}^{n=\infty} \frac{f_2(DS - Sf_2)^n}{(D + S - f_2)^{n+1}\alpha^n} Z^n. \quad (3)$$

Due to the fact that the following equation $$(DS - Sf_2)(Z << D + S - f_2 \quad (4)$$

usually holds, Equation (2) and Equation (3) can be approximately expressed as $$S_2 = \frac{f_2(D + S)}{D + S - f_2} - \frac{f_2^2 S^2}{(D + S - f_2)^2 \alpha} Z \quad (5)$$

$$M = - \frac{f_2}{D + S - f_2} - \frac{f_2(DS - Sf_2)}{(D + S - f_2)^2 \alpha} Z \quad (6)$$

respectively. Equation (5) indicates that this system will focus reasonably well if Equation (4) is satisfied, and the focal length of the focusing lens is much shorter than d. The residual variation of the focal distance upon Z will be diminished by the depth of field of the image as determined by the focusing lens 18 and the aperture stop 22. Similarly, Equation (6) indicates that, the amplification of this anamorphic lens system is linearly proportional to Z. Therefore, the image impinging on the image plane of the camera is distorted locally, but is globally recognizable. This property, in addition to the unlimited variation of distortion provides a powerful tool for recording images, such as distorted photographs. An important characteristic of the invention, as can be seen by referring to Equations (5) and (6), allows the relative change of M to be independent of $f_2$ while the relative change of $S_2$ is proportional to $f_2$. Thus, the design of the variable anamorphic lens system allows a considerable distorted photographic effect while the image remains in sharp focus.

The transformation lens 14 is made of transparent optical material possessing a uniform refractive index. The principle surface of the lens is therefore a curved one as described above. This lens, however, can be made of optical material with non-uniform refractive index, and having substantially planar surfaces, whereby images are formed using substantially the same principle.

The transformation lens element is configured primarily with a substantially planar interior surface 40, and a generated exterior surface 44. In this way, the thickness of the lens expressed in the same Cartesian coordinate is $$Y = \sqrt{\frac{K^2}{Z^2} - X^2} + A \quad (7)$$

As is determinable by Equation (2) or Equation (5), the variable anamorphic lens system of the present invention will not defocus the image of the objects if the focusing lens is of relatively short focal length. That is, the image focus shift caused by variations in the segments of the image transformation lens is not obvious when the focal length of the focusing lens is short and the aperture stop with which the combined lens systems are used is relatively small. The shorter the focal length of the focusing lens 18, the greater the depth of focus of the combined lens system for a given effective aperture stop opening. Therefore, the image formed on the image plane of the image recording instrument is substantially sharp across the image plane, notwithstanding that certain portions of the image are imaged through different focal length portions of the optical system, as compared to other image portions.

Figure 3:
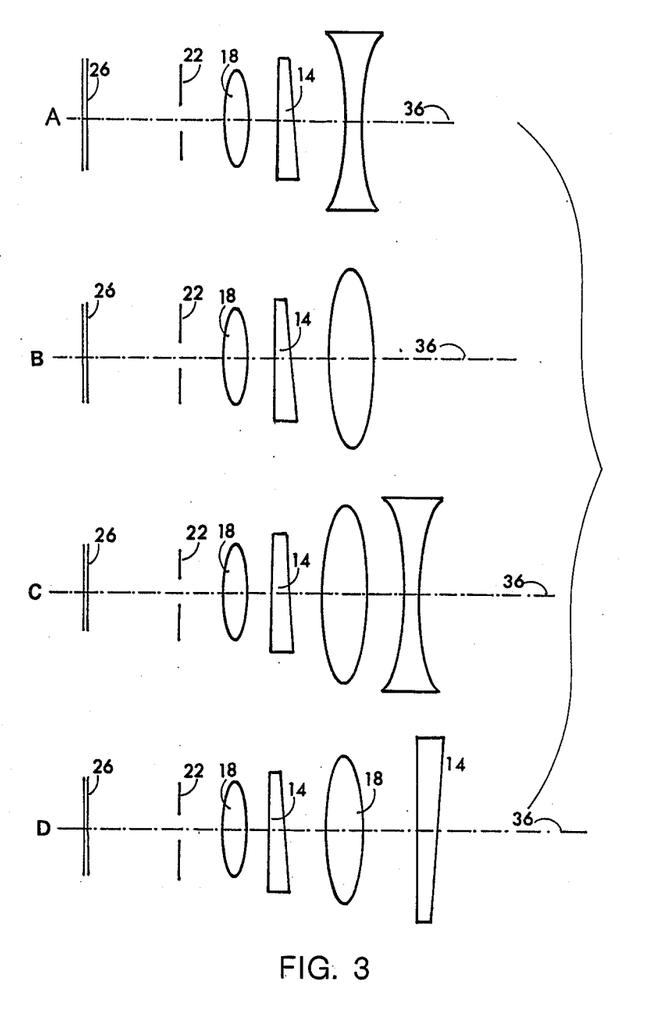
FIG. 3 depicts four configurations of variable anamorphic lens systems including various combinations of convex, concave and image transformation lenses.
Figure 4:
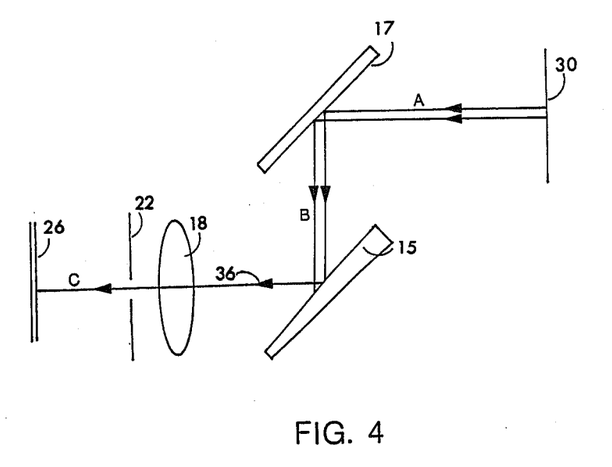
FIG. 4 is a schematic representation of the image transformation mirror system Which achieves the same photographic effect, the reflecting surface of the mirror possesses the same geometric shape as the image transformation lens with different value of parameter K.
Figure 5:
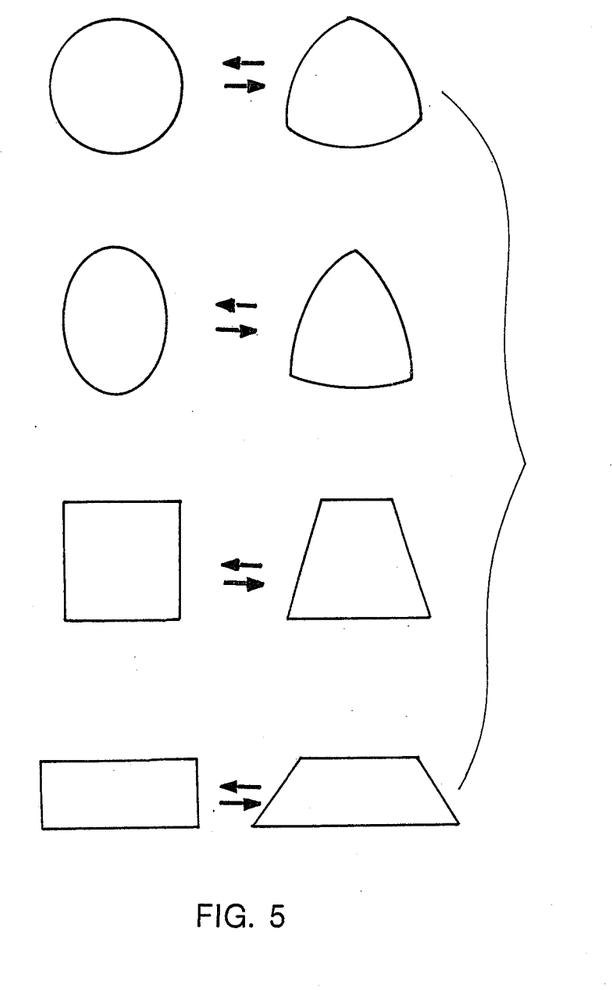
FIG. 5 shows selected patterns of geometric shapes and the image transformation of these shapes.

While the invention has been described in complete detail and pictorially shown in the accompanying drawings it is not to be limited to such details, since many changes and modifications may be made to the invention without departing from the spirit and the scope thereof. For example, the basic lens system can be used in combination with concave and convex lenses such as are used for microscopes and telephoto lenses, as shown in FIG. 3, to achieve different photographic purposes. Additionally, an optical system, as shown in FIG. 4, may be set-up that consists of an object plane 30, a flat reflecting mirror 17 and an image transformation mirror 15. These elements are then used in combination with a camera lens system consisting, in series, of a focusing lens 18, an aperture stop 22 and a camera image plane 26.

As shown in FIG. 4, a first optical object beam (A) derived from a remote object at or near the object plane 30 is received by the flat reflecting mirror 17. The flat reflection mirror is positioned at an angle to allow the first optical beam (A) to be received and reflected as a second optical object beam (B) that is normal to the first beam (A). The image transformation mirror 15 is located at an optimum distance from the mirror 17 and at a similar angular position as the mirror. When the second optical object beam (B) is received, the image transformation mirror 15 reflects a third optical object beam (C). This third beam is reflected along the optical axis of the camera lens system terminating at the system's image plane 26.

The image transformation mirror 15 is configured with a substantially planar interior surface and a generated exterior surface. The generated exterior surface comprises a centrally located substantially planar section and a generally convex surface extending substantially parallel and above said planar section and a generally concave surface extending substantially parallel and below said planar section. The exterior surface can be further defined by the terms $Z^2(X^2 + Y^2) = K'^2$ where $K'$ is a constant defining the extent of the mirror's surface curvature.

By manipulating the image transformation mirror 15, by a manipulating means, either singularly or in combination with the flat reflecting mirror 17, the shape of the remote object can be changed to allow a transformed image of the object to appear at the camera image plane. The entire object may be changed or selected portions of the object can be isolated and selectively transformed.

Hence, the invention is described to cover any and all modifications and forms which may come within the language and scope of the claims.

We claim:

1. A variable anamorphic lens system comprising:

(a) an optical element defining an optical axis and having a first optical surface substantially ahead of a plane perpendicular to said optical axis, (b) a second optical surface substantially behind said plane perpendicular to said optical axis, and (c) said first optical surface of said element being configured at variable distances relative to said perpendicular plane wherein thickness variation of said element causes a variation of effective focal length of said optical system as defined by the equation $$Z^2(X^2+Y^2)=K^2,$$

where $X^2$, $Y^2$ and $Z^2$ are the coordinates relative to the lens axis and $K^2$ is a constant defining the extent of the curvature of the surface of the optical element.

2. The lens system as specified in claim 1 wherein at least one of said optical surfaces is substantially planar whereby said image of a remote object is undistorted.

3. A variable anamorphic lens system comprising in combination an image transformation lens, a focusing lens and an aperture stop defining an optical axis, wherein:

(a) said image transformation lens having a first optical surface ahead of a plane perpendicular to said optical axis, (b) a second optical surface behind said plane perpendicular to said optical axis, (c) said first optical surface further having several surface portions defined by the equation $$Z^2(X^2+Y^2)=K^2$$

where $X^2$, $Y^2$ and $Z^2$ are the coordinates relative to the lens axis and $K^2$ is a constant defining the extent of curvature of surface portions of said image transformation lens, and (d) adjacent of said surface portions of said first optical surface of said image transformation lens having different degrees of curvature, and thickness variations across said optical surfaces causing local variation of portions of images formed by said surface portions.

4. The lens system as specified in claim 3 usable with a camera wherein said focusing lens thereof is of a focal length shorter than the diagonal of said image formed at said usage plane, whereby the depth of focus of said focusing lens is sufficient to cause said transformed image to be focused sharply on an image plane of a camera.

5. The lens system as specified in claim 3 wherein said image transformation lens is configured with a substantially planar interior surface and a generated exterior surface where said generated exterior surface comprises a centrally located substantially planar section and a generally convex surface extending substantially parallel and above said planar section and a generally concave surface extending substantially parallel and below said planar section.

6. The lens system as specified in claim 3 wherein said system is used in combination with a camera lens system comprised of a focusing lens, having an aperture stop and a camera for locating an image on the image plane of said camera when where said variable anamorphic lens system is located in series with said camera lens system.

7. The lens system as specified in claim 6 wherein by rotating said camera barrel said image transformation lens modifies or transforms the image of a remote object, or a selected portion thereof, so that an altered image is formed on the image plane of the camera.

8. A variable anamorphic lens system comprising:

(a) a flat reflecting mirror positioned at an angle to allow a first optical object beam, derived from a remote object at or near an object plane, to be received and reflected as a second optical object beam that is normal to the first optical object beam, (b) an image transformation mirror located at an optimum distance from said flat reflecting mirror and at a similar angle as said flat reflecting mirror, where the reflecting surface of said image transformation mirror receives said second optical object beams and causes a third optical object beam to be reflected, and (c) a camera lens system comprising, in series, a focusing lens, an aperture stop and an image plane where the third optical object beam is reflected along the optical axis of said lens system, where, when said transformation mirror is manipulated, by a manipulating means, either singularly or in combination with said flat reflecting mirror the shape of the remote object can be changed to allow a transformed image of the object to appear at said image plane of said camera.

9. The lens system as specified in claim 8 wherein said image transformation mirror is configured with a substantially planar interior surface and a generated exterior surface where said generated exterior surface comprises a centrally located substantially planar section and a generally convex surface extending substantially parallel and above said planar section and a generally concave surface extending substantially parallel and below said planar section, where said exterior surface is further defined by the equation $$Z^2(X^2+Y^2)=K'^2$$

where $X^2$, $Y^2$ and $Z^2$ are the coordinates relative to the lens axis and $K'^2$ is a constant defining the extent of the mirror's surface curvature.

* * * * *